Dec. 24, 1963  M. M. SAFFIAN  3,115,079
PROCESSING HEAD FOR PHOTOGRAPHIC MECHANISM
Filed Jan. 24, 1962  3 Sheets-Sheet 1
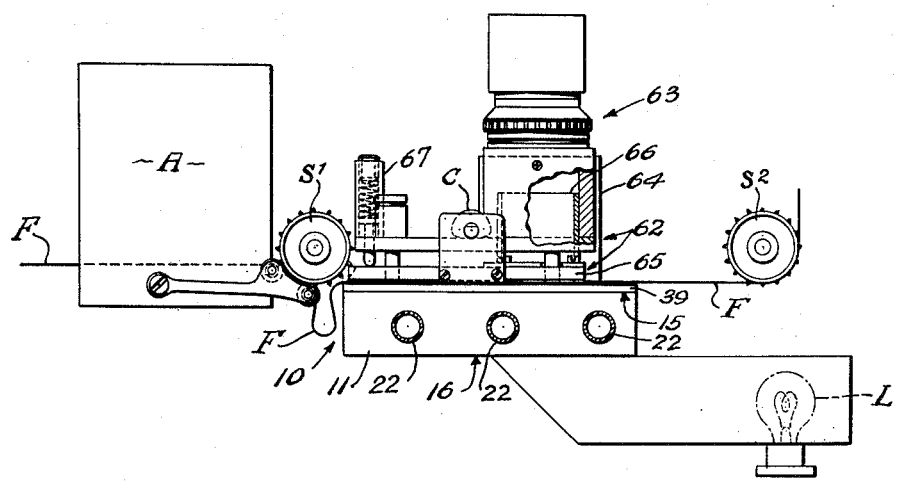
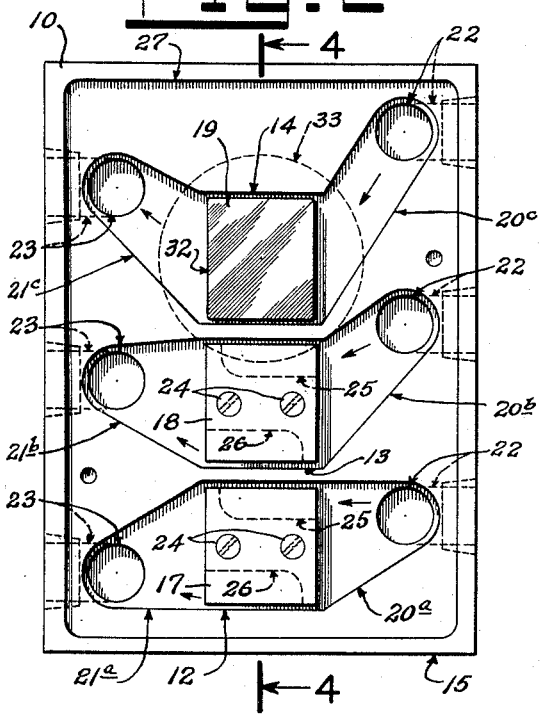
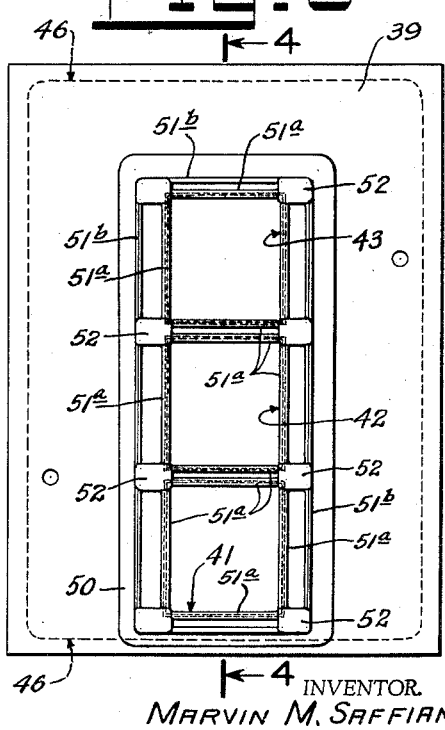
INVENTOR.
MARVIN M. SAFFIAN
BY
John M. Montstream
ATTORNEY

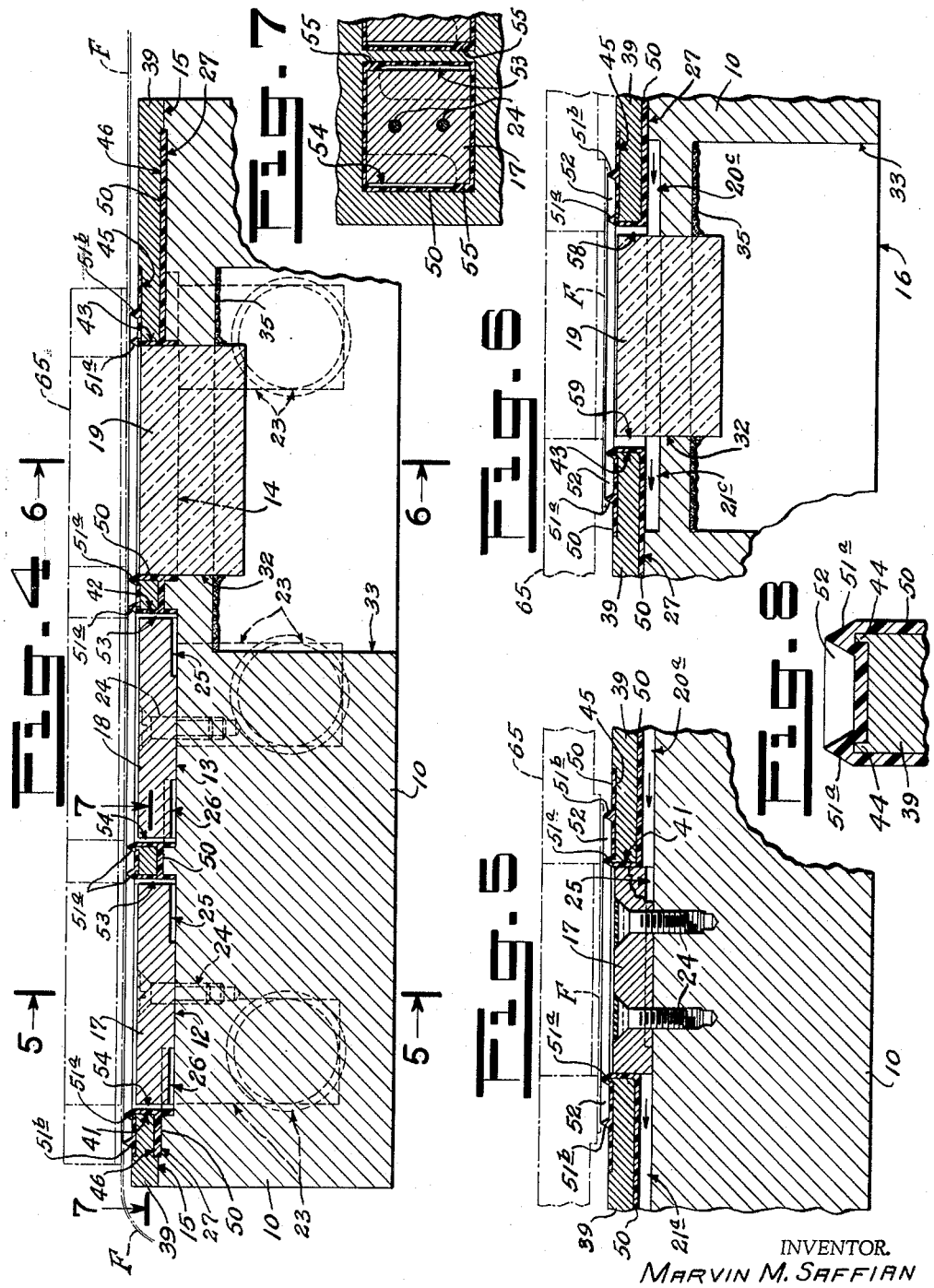

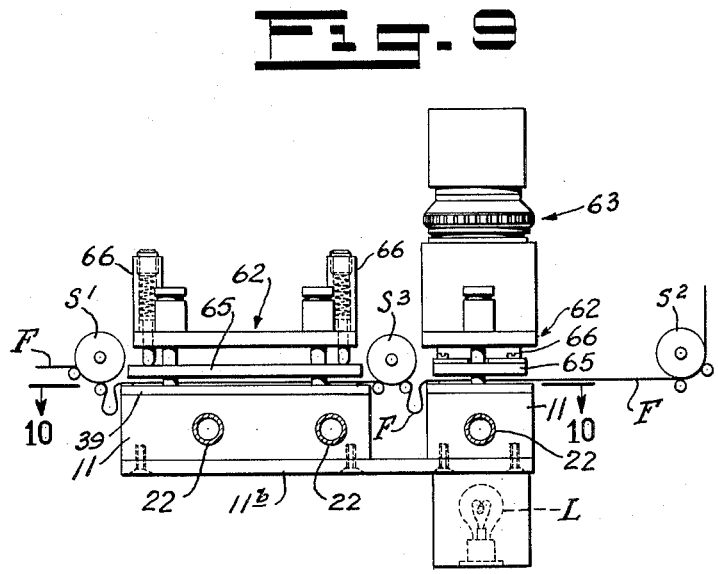
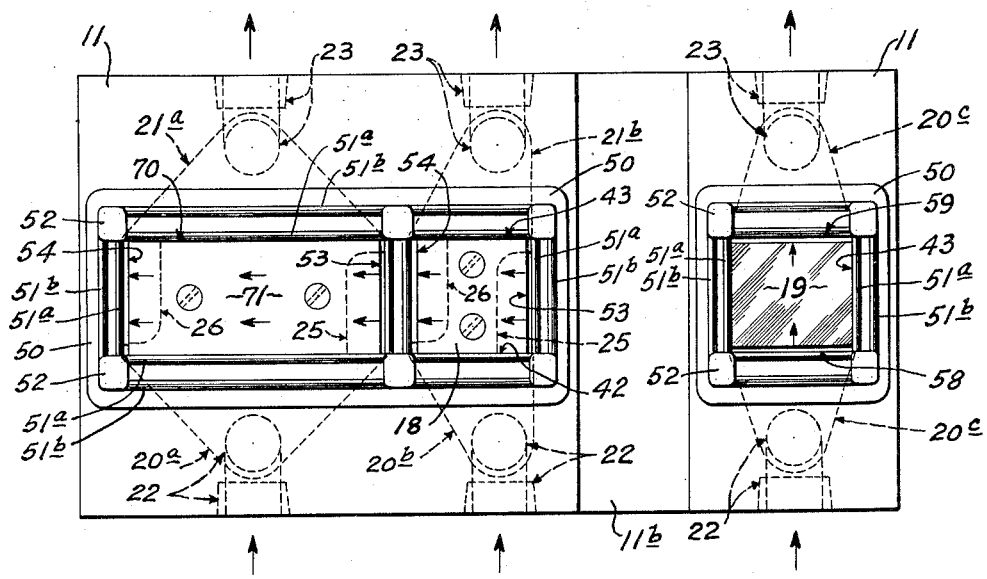

United States Patent Office 3,115,079
Patented Dec. 24, 1963

3,115,079
PROCESSING HEAD FOR PHOTOGRAPHIC MECHANISM
Marvin M. Saffian, New York, N.Y., assignor to OPTOmechanisms Incorporated, Mineola, N.Y., a corporation of New York
Filed Jan. 24, 1962, Ser. No. 168,422
20 Claims. (Cl. 95—12)

The invention relates to a film processing head which forms part of a photographic mechanism. The photographic mechanism takes a picture such as of the picture screen of a radar or like device and then immediately processes the photograph. With such mechanism it is desirable to view the picture as soon as it is processed and to this end a projection means usually forms a part of the complete mechanism. The processing head described herein has the film continuously fed thereover but intermittently as to the frames by suitable film feed means forming a part of the photographic mechanism. In the processing head particularly described and illustrated the exposed film is developed at one station or position, fixed at a second station or position and washed at a third or last station or position provided in the head. There are processing fluids which develop and fix simultaneously and the head to be described may be constructed for such fluids. The invention also relates to a processing head which is constructed to enable viewing of the processed film at the film wash position or station.

It is an object of the invention to construct a film processing head which produces a clear finished film without extraneous spots, streaks, scratches and the like.

Another object is to construct a film processing head which flows a processing fluid through a processing station or stations in the head longitudinally of the film.

A further object is to provide a film processing head which is effectively sealed against external and internal leakage of fluid.

Another object is to construct a film processing head which washes the film after it is processed at a washing station which washing station is so constructed that the processed film may be viewed by projection at this station.

A still further object is to construct a film processing head which provides projecting means at the wash station.

Another object is to construct a film processing head for photographic mechanism which can be used with different kinds of processing fluids and films having different emulsions depending upon those which may be available.

Other objects of the invention will appear more fully from the following description when taken in connection with the accompanying drawings, illustrating a preferred embodiment, in which:

FIG. 1 is a side elevation in reduced scale of a photographing mechanism with the processing head;

FIG. 2 is a plan or top view of the base of the processing head;

FIG. 3 is a plan view of the top of a gasket or cover plate with its gasket;

FIG. 4 is an enlarged longitudinal section of the assembled processing head taken on line 4—4 of FIGS. 2 and 3;

FIG. 5 is an enlarged sectional view taken on line 5—5 of FIG. 4 with a short section at the entrance to the pedestal inlet passage;

FIG. 6 is an enlarged sectional view taken on line 6—6 of FIG. 4;

FIG. 7 is a sectional view taken on line 7—7 of FIG. 4;

FIG. 8 is an enlarged sectional view of a ridge at the cover plate openings;

FIG. 9 is a side elevation of another form in reduced scale; and

FIG. 10 is a plan view of the form of FIG. 9 in full scale.

The processing head is used with a photographing machine which includes a photographing or exposure means A at exposure position which means includes a lens and a shutter for exposing a frame of the film F. A first film feed means including sprocket S–1 feeds the film continuously but intermittently as to frames through the exposure or photographing position. The film is then fed over the processing head 10 by a second film feed means which feeds the film continuously but intermittently as to the frames which includes a sprocket S–2. As will be described hereinafter, a pressure head has a spring propelled pressure plate which presses the film against the processing head. The pressure plate may be raised by means of a cam C for inserting the film therebetween. A processed film frame may be viewed at the washing station with a lamp L projecting a beam of light through the film and a projecting lens onto a screen (not shown).

The processing head 10 is particularly shown with three processing stations or positions or station cavities, the first being for a developing fluid to develop the exposed film, the second being for a fluid for fixing and/or clearing the developed film and the third or last station being a wash station for a washing fluid or water. There are processing fluids which simultaneously develop and fix the film for which fluids the head herein may be provided with two fluid cavities or stations, one for combined fixing and developing and a second or last station for washing. In addition in both the three station or unit head and in the two unit or two station head, or in a head having more than three stations, the last station may be so constructed that the picture which has been taken may be viewed during the film washing period, such as by projecting it on a screen. With a first film feed means to feed the film through the photographing position and with a separate second film feed means to feed the film through the processing head, the time interval for developing and for fixing may be the same or may be different thereby giving selectivity to the processing of the film. The film feed means may be through suitable geneva drive means (not shown) forming a part of the photographing mechanism. It is clear, that in a broader aspect of the construction of the head, it is not necessary that the film be viewed at the same time that the film is being washed in which event the viewing will occur thereafter.

The processing head 10 includes a base 11, FIG. 2, which has at least two fluid stations which are in line and spaced apart a distance corresponding with the frame spacing of the film used. The head particularly shown has a first or developing cavity or station 12 and adjacent thereto a second or fixing cavity or station 13 and a washing or last cavity or station 14 adjacent to the fixing station. This base may be located immediately adjacent to the photographing or film exposure position of the photographing means A. However for space convenience there is one frame between the photographing position and the first processing station. This film frame spaced between the photographing station and the processing head however is not an essential characteristic since this spacing from the photographing position or station may be a distance less than the length of a film in which event the film frame would be looped therebetween. The base has a top surface 15 and a bottom surface 16.

Each processing station has an inlet chamber and an outlet passage which latter passage is shown as an outlet chamber. These chambers may be formed by providing the station cavity with a dimension in the direction of film movement the same as or approximating the frame length. A pedestal 17, 18 and 19 is provided respectively in each station cavity 12, 13 and 14 and is shown centrally of its cavity so that it serves also as a partition which, with gasket means to be described, divides its cavity into an inlet chamber 20a, 20b and 20c and an outlet passage or chamber 21a, 21b and 21c respectively. Each inlet chamber has an inlet connection 22 therewith extending to one side of the base and each outlet cavity has an outlet connection 23 therewith to the opposite side of the base. The inlet and outlet chambers for each station cavity extend at different angles with respect to their centers in order to provide sufficient space therebetween to allow standard fittings to be threaded into their inlet and outlet connections. Preferably each pedestal is a separate member and pedestals 17 and 18 are secured to the base and in its respective station cavity such as by screws 24. Each pedestal 17 and 18 has an inlet passage 25 extending from the inlet chamber side edge thereof and open at the forward edge for most of the length thereof whereby the end of this passage at the outlet chamber is obstructed. Each pedestal 17 and 18 has an outlet passage 26 in its rear edge and extending to the outlet chamber. This passage extends for most of the length of this edge so that the end adjacent to the inlet chamber is obstructed. The top surface 15 of the base has a gasket recess 27 extending over essentially the whole surface with a narrow rim around the edge.

In order to simplify the overall construction and to enable an earlier viewing of the finished photograph or frame, the last or wash station 14 is constructed so that the processed film frame may be viewed at this station. The base has a rectangular pedestal hole 32 extending to a base opening or light hole 33 which latter hole extends to the bottom surface 16 of the base. The transparent pedestal 19 is secured to the base in any suitable manner that shown being a tight or press fit for the pedestal in the pedestal hole. The pedestal is then sealed and cemented with a sealer 35, such as a silicone composition, around the pedestal and shown as at the upper surface of the light hole 33. A beam of light from a lamp L may be passed through the pedestal and the film, then through a lens 63, shown as carried by the film pressure mechanism although this is not necessary and projected onto a screen. With a processing head, so constructed, the film is viewed at the same time that the film is being washed.

The processing head includes a cover or gasket plate 39 which is secured to the top surface of the base, such as by adhesion of a gasket means to be described. The plate has a plurality of spaced openings 41, 42, and 43 therein corresponding in number to the number of processing cavities or stations in the base and spaced apart a distance corresponding with the space dimension between film frames. The openings correspond in dimension with a film frame. Each cover plate opening has side edges, a forward edge and a rear edge which latter edge is towards the photographing position. Preferably at least two edges of each opening carries an upstanding lip or rib 44 in order to provide, primarily, additional surface for adhesion of a gasket means, also to more firmly anchor the gasket means against any possibility of lateral displacement and to give a little more rigidity to the inner inverted V of the gasket means as will appear. The top surface of the cover plate preferably has a gasket means recess 45 around the openings. The bottom surface preferably has a gasket means recess 46 over most of the surface with a narrow rim around the edges and corresponding in dimension with the gasket means recess 27 in the top surface of the base.

Gasket means 50 is provided on the top of the cover plate to provide a seal between the film and the cover plate or processing stations, to seal all joints between the cover plate and the base, as well as at the pedestals. The gasket means covers each edge of each cover plate opening and extends onto the top surface of the cover plate adjacent to the openings and particularly as defined by the top gasket recess 45 in the cover plate. The gasket means between the forward edge of one opening and the rear edge of the next adjacent opening merge or is integral as it is throughout. This gasket means is provided with film sealing means of suitable form on the top surface and adjacent the openings. It has been found that rectangular configurations 51 on the top surface of the cover plate of inverted V cross section provide an effective seal. A rectangular configuration 51a is at the edges of each opening. Preferably a second configuration 51b around the outside of all of the configurations 51a and spaced a short distance therefrom. This double configuration assures an adequate seal against leakage of fluid from between the film and the gasket means as well as to provide a wiping action between openings to wipe the film clean of processing fluid thereon as the film is fed from one cavity or processing station to the next station. This avoids contamination or substantial contamination of one fluid by the preceding processing fluid. With a three cavity or station head, the developing solution or fluid is wiped free as the film passes to the fixing station or position and the fixing solution is wiped off of the film as the film is fed to the last or washing solution. With a film having sprocket holes along its edge, it is desirable though not necessary, that the side edges of the configuration 51b of inverted V cross section be spaced from the side edges of the configurations 51a, so that the latter engage the film just inside of the sprocket perforations on the side of the film and the outer V configuration 51b engages the film just outside of the sprocket perforations in the film. With a film without sprocket perforations, the configurations may be located as desired. At the corners of the spaced inverted V's of the gasket means are pads 52 which seal the sprocket holes in the film at these positions. The rib 44 projects centrally or approximately centrally of the inverted V at the edges of the openings. A similar rib may be provided for the outer configuration 51b if desired. A moldable silicone rubber has been found to be a suitable gasket material which is applied in paste form and molded. The surfaces to which the gasket means is to adhere is treated in known manner.

Each pedestal 17 and 18 is dimensioned so that it engages the gasket means at opposite edges of its opening in the cover plate to seal the same. Each of these pedestals is dimensioned to leave a narrow slot at the other two opposite edges, one of which slots is an inlet slot connected with the inlet chamber and the other is an outlet slot connected with the outlet passage or chamber. The inlet and outlet slots may be at the side edges of the opening for cross flow of the fluid across the film. It is preferable, however, for the developing station and the fixing station to have the inlet slot at either the forward or rear edge of the cover plate opening and the outlet at the other edge. As shown the inlet slot 53 is at the forward edge of its opening and pedestal, and the outlet slot 54 is at the rear edge of its opening and pedestal. With the slots so located, the gasket means is formed to obstruct and form a corner seal 55 (FIG. 7) or a small portion at the slotted edges at opposite corners of the pedestal for the full vertical height of the pedestal and station cavity. This sealing portion is on the outlet chamber side or corner for the inlet slot 53 and on the inlet chamber side or corner for the outlet slot 54. The corner seals of the gasket means, therefore, seals any connection between the inlet chamber and the outlet slot and similarly at the other opposite corner of the pedestal seals the inlet slot against any connection with the outlet chamber or passage. With the inlet and outlet slots so located and with a pedestal inlet passage 25 and a pedestal outlet passage 26, the gasket means at the inlet end (FIG. 5) and outlet end of these pedestal passages is open for connection with its respective inlet chamber and outlet chamber.

The inlet chamber for each station cavity is of substantial dimension as compared to the area of the inlet slot which provides turbulence for the processing fluid just before it passes through the inlet slot and provides smooth fluid flow through the inlet slot and hence between the film and the top of the pedestal to the outlet slot. Although the outlet chamber is shown as of the same or equivalent size as the inlet chamber, this is not essential although desirable to assist in securing smooth outlet flow through the outlet slot.

The top of each pedestal is positioned a little below the top surface or tips of the inverted V's 51 of the gasket means 50 so that a fluid channel is provided between the top of the pedestal and the film for the processing fluid to flow in contact with the film. In the construction illustrated, the developing station construction is identical to that for the fixing station excepting as to the shape of the inlet chamber and outlet chamber. As particularly constructed, the fluid flow in both the developing and fixing stations is from the forward edge of the plate opening to the rear edge thereof. There is then, a fresh stream of processing fluid across the width of the film at the inlet slot. The flow of the processing fluid in the preferred construction illustrated, is longitudinally of the film. Preferably too the fluid flow is in a direction opposite to the direction of film movement or feed.

For space and economic reasons, the inlet slot 58 and the outlet slot 59 for the wash or last station or cavity 14, are preferably provided at the side edges of the cover plate opening and of the pedestal so that the wash water or solution flows crosswise of the film over the top of its pedestal 19. Longitudinal flow with respect to the film is of no importance here for film washing. The distance between the film and the top of all of the pedestals may be from about 1/64 of an inch to about 1/8 of an inch with better results being secured with a dimension in a region close to the 1/64 of an inch dimension.

The film F is pressed against the top surface or peaks of the inverted V configurations 51 of the gasket means by a pressure head 62 which preferably is attached to the base by a bracket 64 and has a pressure plate 65 which may be of any suitable construction and pressed downwardly by spring means 67. The base or pressure head carries a projecting lens means 63 in alignment with the transparent pedestal 19 of the last or wash station. A tubular light shield 66 is mounted on the pressure plate 65 and slides in a hole in the pressure head and lens mount in alignment with the projecting lens means 63. The film is often but not necessarily projected upon a screen (not shown).

Using a film in which the developing takes two units of time such as four seconds and the fixing takes one unit of time or two seconds or vice versa and with a head having processing stations of one frame length, the photographing mechanism with which the film processing head is used may be operated such that one frame of two successive frames is exposed and processed. This is because the sprocket 32 will operate alternately at intervals of four seconds for developing and two seconds for fixing. Each frame could of course be exposed but since the developing and fixing times are different, one pair of alternate frames out of four would be properly processed and the other pair of alternate frames would be under developed and over fixed. An alternate operation would be such that one frame of four consecutive frames is exposed and properly processed and three are not. If the film is one in which the developing and fixing time is the same, the film feed means or sprocket would feed at the same time interval so that then each frame will or may be exposed and properly processed. It is clear too that the film may be fed continuously through the head of FIGS. 1 to 8 rather than intermittently by frame lengths when the processing fluids are such that, the developing and fixing times are the same.

Continuous film feed or uniform intermittent film feed through the head may be used when the processing and fixing times are different by proportioning the length of the processing stations to the relative developing and fixing times. For example, if the developing time is four seconds and the fixing time is two seconds then with continuous or uniform intermittent film feed the developing station would be two frames in length and the fixing station would be one frame in length. With the station so proportioned in length, the developing time is twice that of the fixing time with either continuous or intermittent film feed.

The processing head of FIGS. 9 and 10 is essentially the same as that of FIGS. 1 to 8 with the principal difference being that one of the processing stations, is longer than the other. Usually the longer processing station is the developing station as shown since this process is more often the longer one in time. The fixing and wash stations are the same as these stations of FIGS. 1 to 8 and need not be again described. In the processing head of FIGS. 9 and 10, the longitudinal length of the gasketed opening in the cover plate for one of the processing stations is proportioned with respect to the developing and fixing time. The pedestal for the elongated station is of corresponding longitudinal length, that is with the inlet and outlet slots at the front and rear edges of the plate opening, the pedestal is shorter than the gasketed opening by the width of the slots, however, with the inlet and outlet openings at the side edges of the cover opening for cross fluid flow, the pedestal would have a length the same as the gasketed opening in the cover plate. With the head of FIGS. 9, 10 the film may be fed continuously. As particularly illustrated the developing station is two frames long, that is the cover plate opening 70 is two frames long and the pedestal 71 is of corresponding length. It is clear that this longer developing station may be substituted for the film frame length developing station opening 41 and pedestal 17 of FIGS. 1 to 8 in which event uniform intermittent film feed corresponding to the fixing time will give a developing period of twice the time of a station of one frame length. So constructed every film frame may be exposed and processed.

The form of processing head of FIGS. 9 and 10 also shows the washing and viewing station spaced from the fixing station and connected together as a unit in any desirable way such as by a base plate 116. These stations are spaced for a processing head for continuous film feed over the head, however, it may be desirable that the viewing of the film be with intermittent film feed through the washing viewing station. For this the washing station is spaced from the fixing station to provide room for a continuous film feed means such as roller S3 for the processing stations and the roller S2 is driven intermittently for advance by one film frame. Hence the processed picture will remain stationary for a definite period while being viewed. The film has a loop after passing through the feed roll S3 from the fixing station and as the film is fed intermittently through the wash-view station the loop is taken up. So constructed every film frame may be exposed and developed.

The continuous film feed through the developing and fixing stations has this feature, that the ratio of time processing or station length may be fractional. For example if the relative time for fixing is two seconds and for developing is three seconds then the developing station may be made 1½ frames long with the fixing station one frame long for a film feed such that it takes two seconds for the film frame to pass through the fixing station. So constructed each frame may be exposed and processed.

The film feed means of FIGS. 9 and 10 are shown as rollers to show the equivalency thereof with sprocketed wheels.

One of the problems with the fixing and processing heads heretofor used, the processed film has been spotty, streaked, scratched or the like which materially reduces the clarity or definition of the film for direct examination as well as for projection if provided. Such spots and streaks interfere with depth of contrast and distinctness in the picture however examined. With the processing head described, the film is clear and the full depth of shading or contrast of the exposed film is secured since there is no merging or interference of exposed areas of the film having low depth of shading with spots and streaks of similar depth of shading. The fluid flow through the head is preferably by suction pressure so that it can be used on aircraft.

This invention is presented to fill a need for improvements in a processing head for photographic mechanism. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A processing head for a film having film frames and used with a photographing mechanism which mechanism has means to feed the film over the head comprising a base having at least two fluid stations therein spaced apart corresponding with a film frame spacing, each station including an inlet chamber and an outlet passage, said base having a top surface and a bottom, and a pedestal for each station carried by the base between the inlet chamber and the outlet passage and having an upper surface; a cover plate secured to the top surface of the base and having an opening therethrough for each pedestal into which opening the pedestal projects, the openings being adjacent to each other corresponding with the film frames, each opening having a rear edge and a forward edge and side edges, gasket means over all edges of the openings in the cover plate and extending over the top surface of the cover plate adjacent to the edges of the openings to form a seal with the film pressed thereagainst, the gasket means having film sealing means on the top surface of the cover plate and adjacent to the openings, each pedestal having a height locating its upper surface a little below the film sealing means of the gasket means to provide a fluid channel between said pedestal top surface and the film, each pedestal engaging the gasket means at two opposite edges of its opening in the cover plate to seal the same, each pedestal being spaced a small distance from the gasket means at the other two opposite edges to form an inlet slot connected with the inlet chamber and an outlet slot connected with the outlet passage, an inlet connection with each inlet chamber, and an outlet connection with each outlet passage.

2. A film processing head as in claim 1 in which the gasket means includes a portion of relatively short length at the forward and rear edges at opposite corners of each opening and extending the full height of the pedestal, said pedestal being spaced a small distance from the forward edge and rear edge to form an inlet slot and an outlet slot respectively, said pedestal having an inlet connecting passage connecting the inlet chamber with the inlet slot, and said pedestal having an outlet passage connecting the outlet slot with the outlet passage.

3. A film processing head as in claim 1 in which the pedestal of the last fluid station has a bottom and is transparent and is secured to the base, and the base has an opening from the bottom of the pedestal to the bottom of the base.

4. A film processing head as in claim 3 in which the transparent pedestal engages the rear and forward edges of the opening in the cover plate to seal the same, and the transparent pedestal being spaced from the side edges to form an inlet slot connected with the inlet chamber and an outlet slot connected with the outlet passage.

5. A film processing head as in claim 1 including an an upstanding rib at least at the forward and rear edges of the openings in the cover plate and embedded in the gasket means.

6. A film processing head as in claim 5 including film sealing means of inverted V cross section at the edges of the openings in the cover plate, and the ribs being in alignment with the film sealing means.

7. A film processing head as in claim 3 including a projecting lens means in alignment with the last station.

8. A film processing head as in claim 7 in combination with a pressure head mounted above the processing head and including a pressure plate to press the film against the latter, and the projecting lens means being carried by the pressure head.

9. A film processing head as in claim 1 in which the base has three spaced fluid stations, and the first and second stations having inlet and outlet slots at the forward edge and rear edge respectively of the opening in the cover plate.

10. A film processing head as in claim 9 in which the pedestal for the last fluid station has a bottom and is transparent and is secured to the base, and the base has a base opening from the bottom of the transparent pedestal to the bottom of the base.

11. A film processing head as in claim 10 including a projecting lens mounting means in alignment with the transparent pedestal of the last station and including a projecting lens.

12. A film processing head as in claim 11 including in combination a pressure head mounted above the processing head including a pressure plate to press the film onto the gasket means, and the projecting lens mounting means being carried by the pressure head.

13. A film processing head as in claim 12 in which the pressure head includes a tubular light shield carried by the pressure plate and slidable in the mounting means.

14. A film processing head as in claim 1 in which at least one of the surfaces including the top surface of the base and the inner surface of the cover plate has a recess to margins adjacent its sides, and the gasket means extending to the margins of the recess.

15. A film processing head as in claim 2 in which the base has three processing stations and the pedestal for the last processing station is spaced from the side edges of its opening in the cover plate to provide an inlet slot connected with the inlet chamber and an outlet slot connected with the outlet passage.

16. A processing head as in claim 1 in which the pedestal for one of the fluid stations has a length greater than a film frame, and in which the gasketed opening in the cover plate for this fluid station has a length corresponding to the pedestal length.

17. A processing head as in claim 16 in which the base includes three processing stations.

18. A processing head as in claim 17 in which the pedestal for the last processing station has a bottom and is transparent and is secured to the base, and the base has a base opening from the bottom of the transparent pedestal to the bottom of the base.

19. A processing head as in claim 18 in which the last processing station is spaced from the next adjacent processing station a distance greater than that of adjacent film frames.

20. A processing head as in claim 18 including a pressure head secured to the base and having a pressure plate means, to press the film against the gasket means, a projecting lens mounting means secured to the pressure head, in alignment with the transparent pedestal and a projecting lens carried by the mounting means.

References Cited in the file of this patent

UNITED STATES PATENTS

| | | |
|---|---|---|
| 2,631,511 | Tuttle | Mar. 17, 1953 |
| 2,727,446 | Tuttle | Dec. 20, 1955 |
| 2,856,829 | Orlando | Oct. 21, 1958 |